(12) United States Patent
Czerwinski et al.

(10) Patent No.: US 10,566,096 B2
(45) Date of Patent: Feb. 18, 2020

(54) ELECTRO-SYNTHESIS OF URANIUM CHLORIDE FUEL SALTS

(71) Applicant: TerraPower, LLC, Bellevue, WA (US)

(72) Inventors: Ken Czerwinski, Seattle, WA (US); Bassem S. El-Dasher, Sammamish, WA (US); William M. Kerlin, Bellevue, WA (US); Aaron J. Unger, Henderson, NV (US)

(73) Assignee: TerraPower, LLC, Bellevue, WA (US)

( * ) Notice: Subject to any disclaimer, the term of this patent is extended or adjusted under 35 U.S.C. 154(b) by 285 days.

(21) Appl. No.: 15/673,188

(22) Filed: Aug. 9, 2017

(65) Prior Publication Data

US 2018/0047467 A1 Feb. 15, 2018

Related U.S. Application Data

(60) Provisional application No. 62/373,187, filed on Aug. 10, 2016.

(51) Int. Cl.
| | | |
|---|---|---|
| *G21C 3/54* | (2006.01) | |
| *C25B 1/00* | (2006.01) | |
| *B01J 19/08* | (2006.01) | |
| *C01G 43/08* | (2006.01) | |
| *C25B 11/04* | (2006.01) | |

(52) U.S. Cl.
CPC ............. *G21C 3/54* (2013.01); *B01J 19/087* (2013.01); *C01G 43/08* (2013.01); *C25B 1/00* (2013.01); *B01J 2219/0803* (2013.01); *B01J 2219/0879* (2013.01); *C01P 2006/44* (2013.01); *C25B 11/04* (2013.01)

(58) Field of Classification Search
CPC ... G21C 3/54; C25B 1/00; C25B 11/04; B01J 19/087; B01J 2219/0803; B01J 2219/0879; C01G 43/08; C01P 2006/44
See application file for complete search history.

(56) References Cited

U.S. PATENT DOCUMENTS

| | | |
|---|---|---|
| 5,380,406 A | 1/1995 | Horton |
| 2015/0228363 A1 | 8/2015 | Dewan |

OTHER PUBLICATIONS

Mourogov et al., Potentialities of the fast spectrum molten salt reactor concept: REBUS-3700, Energy Conversion and Management 47 (2006) 2761-2771.
(Continued)

*Primary Examiner* — Peter F Godenschwager
*Assistant Examiner* — Andrew J. Oyer

(57) ABSTRACT

This disclosure describes systems and methods for synthesizing $UCl_3$ from $UCl_4$. These systems and methods may also be used to directly synthesize binary and ternary embodiments of uranium salts of chloride usable as nuclear fuel in certain molten salt reactor designs. The systems and methods described herein are capable of synthesizing any desired uranium chloride fuel salt that is a combination of $UCl_4$, $UCl_3$ and one or more non-fissile chloride compounds, such as NaCl. In particular, the systems and methods described herein are capable of synthesizing any $UCl_3$—$UCl_4$—NaCl or $UCl_3$—NaCl fuel salt composition from $UCl_4$—NaCl.

48 Claims, 5 Drawing Sheets

(56) References Cited

OTHER PUBLICATIONS

Maltsev et al., "Redox potentials of uranium in molten eutectic mixture of lithium, potassium, and cesium chlorides", Russian Metallurgy, MAIKNAUKA-INTERPERIDICA, RU, vol. 2016, No. 8, Dec. 2016.
Kuznetsov et al., "Electrochemical Behavior and Some Thermodynamic Properties of UCl [sub 4] and UCl [sub 3] Dissolved in a LiCl-KCl Eutectic Melt", Journal of the Electrochemical Society, vol. 152, No. 4, Jan. 2005.
International Search Report and Written Opinion for PCT/US2017/04613, dated Jan. 17, 2018, 16 pages.

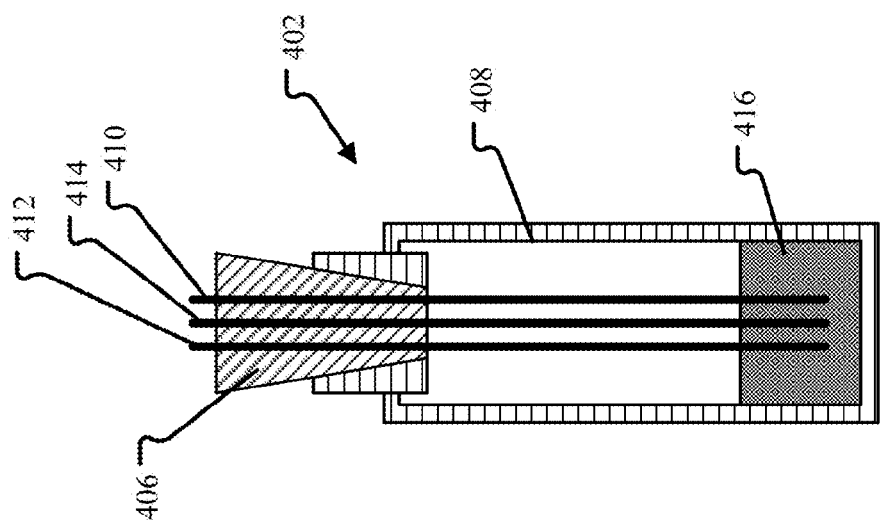
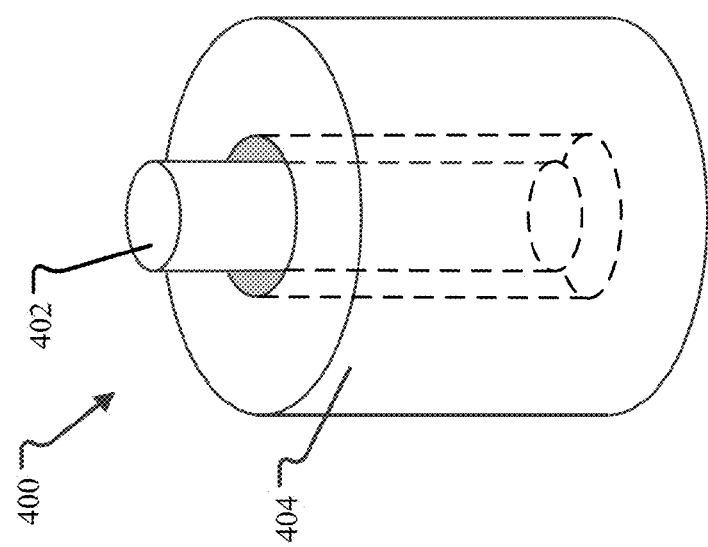
FIG. 4B
FIG. 4A

ELECTRO-SYNTHESIS OF URANIUM CHLORIDE FUEL SALTS

RELATED APPLICATIONS

The present application claims the benefit of U.S. Provisional Patent Application No. 62/373,187, titled "ELECTRO-SYNTHESIS OF URANIUM CHLORIDE FUEL SALTS", filed Aug. 10, 2016.

INTRODUCTION

The utilization of molten fuels in a nuclear reactor to produce power provides significant advantages as compared to solid fuels. For instance, molten fuel reactors generally provide higher power densities compared to solid fuel reactors, while at the same time having reduced fuel costs due to the relatively high cost of solid fuel fabrication.

Binary, ternary, and quaternary chloride fuel salts of uranium, as well as other fissionable elements, have been described in co-assigned U.S. patent application Ser. No. 14/981,512, titled MOLTEN NUCLEAR FUEL SALTS AND RELATED SYSTEMS AND METHODS, and U.S. Provisional Patent Application Ser. No. 62/330,695, titled HIGH THERMAL CONDUCTIVITY NUCLEAR FUEL SALTS AND RELATED SYSTEMS AND METHODS, which applications are hereby incorporated herein by reference. In addition to chloride fuel salts containing one or more of $UCl_4$, $UCl_3F$, $UCl_3$, $UCl_2F_2$, and $UClF_3$, these applications further disclose fuel salts with modified amounts of $^{37}Cl$, and methods and systems for using the fuel salts in a molten fuel reactor.

Binary and ternary fuel salts that include both $UCl_3$ and $UCl_4$ are typically made by separately manufacturing the $UCl_3$ and $UCl_4$ and then mixing them in the appropriate amounts to obtain the final salt composition. There are two main approaches to $UCl_3$ synthesis. The first one reacts uranium metal with hydrogen gas to form uranium trihydride. The uranium trihydride then reacts with injected hydrochloric acid gas to form the $UCl_3$. This reaction requires uranium metal as a reactant which is both expensive and a different uranium compound than what is required to make the $UCl_4$. The second $UCl_3$ synthesis method reacts $UCl_4$ with hydrogen gas at high temperatures (540-580° C.) to directly form $UCl_3$ and hydrochloric acid gas. The problem with this second route is that $UCl_4$ begins to melt close to the operating temperature of the reaction and forms a liquid cap which prevents further reaction with hydrogen gas. The result is very slow reaction kinetics.

Electro-Synthesis of Uranium Chloride Fuel Salts

Where the incorporated applications describe a wide range of binary and ternary chloride fuel salts of uranium, as well as other related salts and technologies, this disclosure describes systems and methods for synthesizing $UCl_3$ from $UCl_4$. These systems and methods may also be used to directly synthesize binary and ternary embodiments of uranium salts of chloride usable as nuclear fuel in certain molten salt reactor designs. The systems and methods described herein are capable of synthesizing any desired uranium chloride fuel salt that is a combination of $UCl_4$, $UCl_3$ and one or more non-fissile chloride compounds, such as NaCl. In particular, the systems and methods described herein are capable of synthesizing any $UCl_3$—$UCl_4$—NaCl or $UCl_3$—NaCl fuel salt composition from $UCl_4$—NaCl.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

FIGS. 4A and 4B illustrate an embodiment of an electrochemical cell that may be used with a potentiostat to determine a suitable electric potential for a set of operating parameters, initial salt composition, and final salt composition.

DETAILED DESCRIPTION $UCl_3$—$UCl_4$-$MCl_n$ Fuel Salts

Embodiments of uranium salts suitable for use as nuclear fuel include salts that are a mixture of $UCl_3$ with one or both of $UCl_4$ and a non-fissile chloride salt. Thus, these fuel salts include 100% $UCl_3$ fuel salt, as well as fuel salts that are mixtures of $UCl_3$ and $UCl_4$ with or without an additional non-fissile chloride salt designated by $MCl_n$. Examples of additional, non-fissile metal chlorides include NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$ and/or $NdCl_3$.

Figure 1:
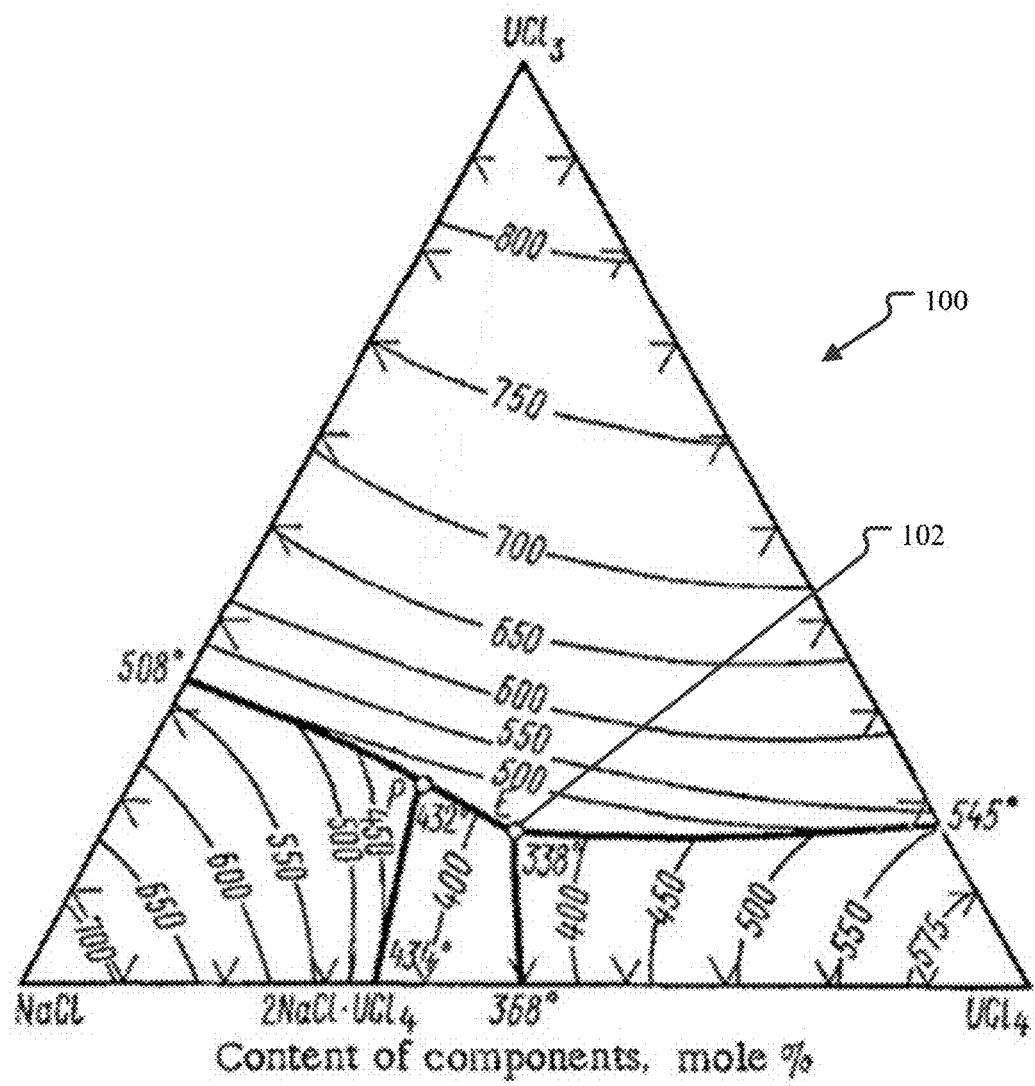
FIG. 1 illustrates a ternary phase diagram calculated for $UCl_3$—$UCl_4$—NaCl fuel salts.

FIG. 1 illustrates a ternary phase diagram calculated for $UCl_3$—$UCl_4$—NaCl fuel salts. The diagram 100 shows the expected melting temperature for any mixture of $UCl_3$—$UCl_4$—NaCl. The eutectic point 102 has a melt temperature of 338° C. and a composition of 17 mol % $UCl_3$, 40.5 mol % $UCl_4$ and 42.5 mol % NaCl (except where specifically stated otherwise, all % values for chemical compounds will be in molar %), which may also be written as $17UCl_3$-$40.5UCl_4$-$42.5NaCl$. The ternary diagram 100 allows the melting point temperature for any specific $UCl_3$—$UCl_4$—NaCl fuel salt embodiment to be identified. Likewise, $UCl_3$—$UCl_4$—NaCl fuel salt compositions having a specific range of melting points can be easily identified. For example, ternary salts with melting points from 300-550° C., 338-500° C., and 338-450° C. may be easily identified.

Electro-Synthesis of Fuel Salts Containing $UCl_3$

Figure 2:
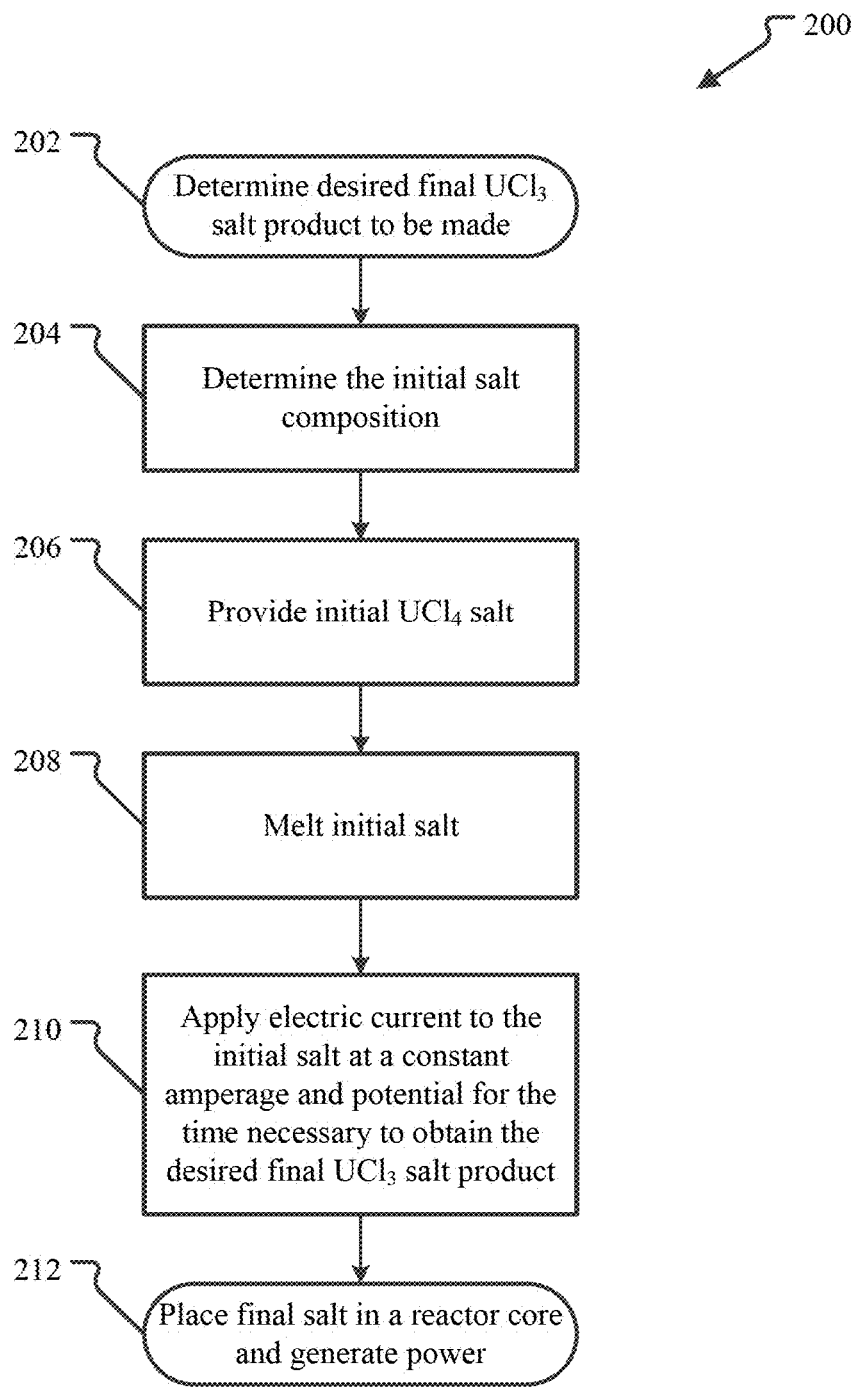
FIG. 2 illustrates a method of electro-synthesis of $UCl_3$ from $UCl_4$.

FIG. 2 illustrates a method of electro-synthesis of $UCl_3$ from $UCl_4$. Embodiments of the method 200 are capable of synthesizing pure $UCl_3$ as well as any desired binary salt of $UCl_3$ and another chloride salt. In addition, an embodiment of the method 200 can produce any ternary salt of $UCl_3$, $UCl_4$, and a non-fissile chloride compounds, such as NaCl. In particular, an embodiment of the method may be used to synthesize any $UCl_3$—$UCl_4$—NaCl fuel salt composition from $UCl_4$—NaCl.

In the embodiment of the method shown, the method 200 starts with an identification of the desired $UCl_3$ fuel salt composition to be made, illustrated by the product identification operation 202. The desired product may be any chloride salt of $UCl_3$ including pure $UCl_3$, a binary salt of $UCl_3$ and another chloride salt, or a ternary salt of $UCl_3$, $UCl_4$, and a non-fissile chloride salt.

From the composition of the desired final product, the initial $UCl_4$ salt composition that is necessary can be determined, as shown in the initial salt determination operation 204. For example, if pure $UCl_3$ is the desired product, an initial salt of pure $UCl_4$ may be used as the initial salt composition. As another example, if a final salt of 50 mol % $UCl_3$ and 50 mol % NaCl is desired, an initial salt of 50 mol % $UCl_4$ and 50 mol % NaCl may be selected.

In the electro-synthesis method 200, the initial salt is then provided in operation 206. This is illustrated by the initial salt preparation operation 206. The initial salt may be prepared, purchased, or otherwise obtained in the operation 206. For example, in an embodiment, the initial salt may be blended from pure $UCl_4$ and non-fissile chloride salt to obtain the initial salt composition.

In the embodiment of the method 200 illustrated, the initial salt is then melted and placed in an electrolysis chamber in a melting operation 208. Depending on the embodiment, the initial salt may be melted inside the chamber or melted outside of the electrolysis chamber and then moved into the chamber. For example, in an embodiment, the electrolysis chamber is a heated vessel into which the constituents of the initial salt, in solid or liquid form, are placed. The vessel is then heated to a temperature sufficient to fully melt the initial salt. The contents of the vessel may be mixed during the melting to ensure the initial salt is homogenous.

In yet another embodiment, the initial salt preparation operation 206 and the melting operation 208 may be combined by independently placing the individual solid constituents (e.g., amounts of $UCl_4$ and one or more non-fissile chloride salts) in the electrolysis chamber and then heating the chamber sufficiently to melt all the constituents, thus forming the initial salt in electrolysis chamber.

The method 200 then applies an electric current to the initial salt in a current application operation 210. To apply the current, two or more electrodes are provided in the electrolysis chamber that are in contact with the molten initial salt. In the current application operation 210, at least one electrode is operated as an anode and at least one other electrode is operated as the cathode. An electric potential is generated between the anode(s) and cathode(s) and current is applied to the initial salt. The electric potential is selected so that the application of current causes the reduction of $UCl_4$ in the initial salt to $UCl_3$. That is, the electrons provided by the applied current stoichiometrically reduce the uranium $U^{4+}$ ions in $UCl_4$ to $U^{3+}$ ions. This, in turn, causes the $UCl_4$ molecules to release a $Cl^-$ ion and become $UCl_3$. In this way, the application of current results in the reduction of $UCl_4$ to $UCl_3$.

As illustrated in FIG. 1, the melting points of different salt compositions may vary significantly and, without agitation, a localized non-uniformity may result in solids forming within the chamber. In order to prevent kinetic effects near the electrodes or non-uniformities within the electrolysis chamber the fuel salt may be agitated during the current application operation 210. The agitation may be provided using any suitable means such as providing an impeller in the electrolysis chamber, vibrating the chamber itself, sparging inert gas through the molten salt, or vibrating one or more electrodes.

In an embodiment, the electric potential used for the electrolysis of $UCl_4$ is selected to preferentially reduce the $UCl_4$ to $UCl_3$ without reducing the other non-fissile chloride compound, if any, in the initial salt at the temperature and pressure at which the electrolysis chamber is operated. The electric potential may be calculated based on the well-known Nernst equation. The Nernst equation relates an electrochemical cell potential to the activities of the electroactive compounds in an electrochemical cell. The Nernst equation can be used to estimate the electric potential necessary to reduce the $UCl_4$ to $UCl_3$ in the initial salt at the temperature and pressure conditions of the electrolysis chamber without reducing the other non-fissile chloride compounds that may be present.

Alternatively, the electric potential may be empirically determined. For example, often the actual voltage needed for electrolysis exceeds the thermodynamical value calculated by the Nernst equation. The additional voltage is referred to as overpotential. In addition, applying an overpotential may increase the rate of reaction and be desired for that effect as well. One method for empirically determining the electric potential to be used for a particular initial salt composition is to use a potentiostat set up to use three electrodes. A potentiostat is a device that typically uses five electrical connections (to a working electrode, counter electrode, reference electrode, sense, and ground) that can be used to investigate the electrochemistry of an electrochemical cell. In the three electrode setup, the ground is left unattached and grounds the electrical connections and the sense is attached to the working electrode. This setup, then, uses the three electrodes to control the voltage difference across electrodes within the cell and then measures the current flow between two of three electrodes. The electric potential between the working electrode and the reference electrode is controlled and the resulting current flow between the working electrode and the counter electrode is measured during which the reduction reaction and its products may be observed. By changing the electric potential to different values, a suitable electric potential for a given reduction reaction based on the operating parameters (e.g., temperature and pressure), initial salt composition, and final salt composition may be determined. This electric potential, then, may be used in larger electrolysis chambers having just anodes and cathodes.

Figure 3:
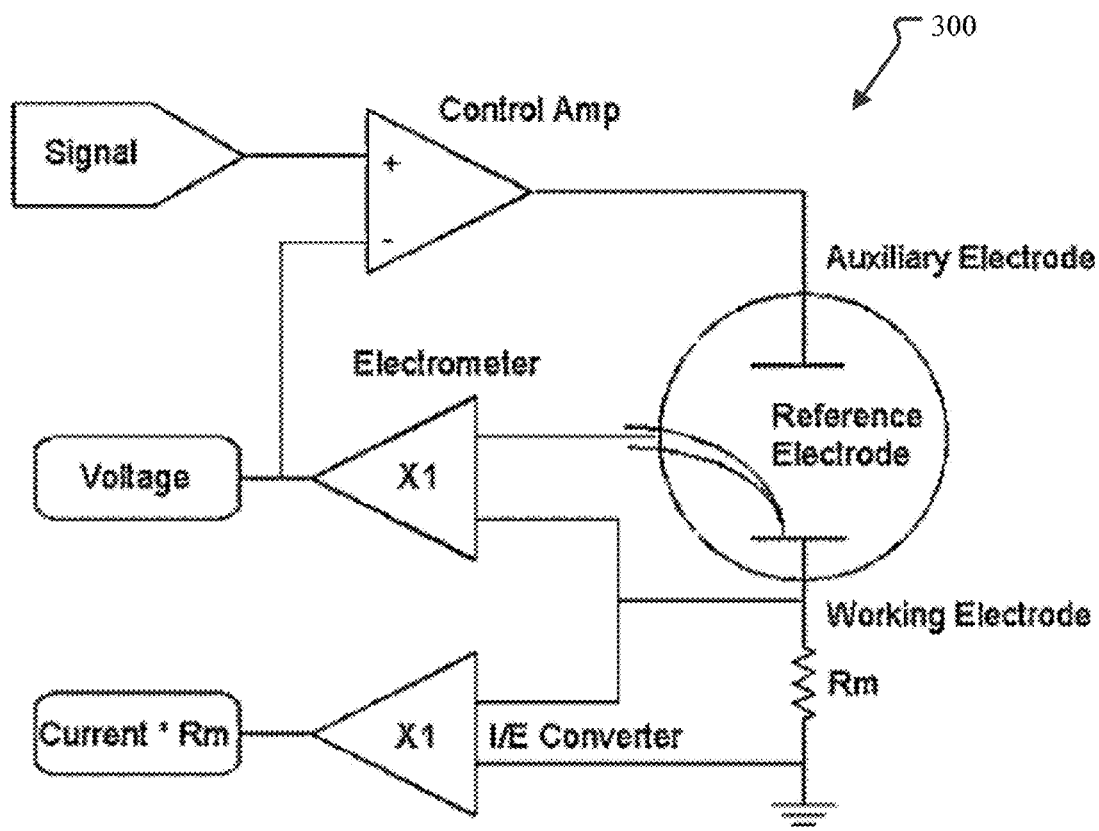
FIG. 3 illustrates a potentiostat circuit that may be used to determine the electric potential that preferentially reduces $UCl_4$ to $UCl_3$ without reducing the other non-fissile chloride compounds that may be present.

FIG. 3 illustrates a potentiostat circuit that may be used to determine the electric potential that preferentially reduces $UCl_4$ to $UCl_3$ without reducing the other non-fissile chloride compounds that may be present. In the potentiostat 300 shown, a current-to-voltage (I/E) converter is provided to measure the cell current. A control amplifier is used to drive current into the cell and also control and maintain the electric potential at the set voltage value using negative feedback. The input signal current is a computer-controlled voltage source, such as the output of a digital-to-analog converter. Via the computer control, the signal may be ramped through any number of voltages and the resulting current and reduction reaction observed for each. In this way, a particularly suitable electric potential for any set of operating parameters, initial salt composition, and final salt composition may be easily determined.

FIGS. 4A and 4B illustrate an embodiment of an electrochemical cell that may be used with a potentiostat to determine a suitable electric potential for a set of operating parameters, initial salt composition, and final salt composition. In the cell setup 400 shown in FIG. 4A, the cell 402 is placed in a vertical melting furnace 404 that acts as a heating element. Heat from the furnace 404 maintains the salt in the cell in a molten state during the reduction reaction. The heat from the furnace 404 may be controlled, e.g., increased or decreased, over time to account for the change in melting temperature of the salt as the reduction reaction proceeds and the relative amounts of $UCl_3$ and $UCl_4$ in the salt change.

A larger view of the cell 402 showing more detail is provided in FIG. 4B. The cell 402 is illustrated as a vessel 408 (e.g., a quartz tube) with a stopper 406 that defines an interior region that acts as a closed electrolysis chamber. The stopper 406 is penetrated by each of the working electrode 410, counter electrode 412, and reference electrode 414 of the potentiostat. These electrodes may take the form of rods made of glassy carbon, an alloy of tungsten, or an alloy of molybdenum. Other electrode materials may also be used. For example, in an embodiment, an electrode may be made of any material that is unreactive with $UCl_4$ and $UCl_3$ at temperatures from 350-900° C. and pressures between 0.5 and 10 atm. Likewise, the vessel 408 and stopper 406 may be made of any material that is unreactive with $UCl_4$ and $UCl_3$ under the same conditions. For example, one or more of quartz, glassy carbon, an alloy of tungsten, or an alloy of molybdenum may be used. In the embodiment shown, a quartz vessel and stopper are used, along with a working electrode of molybdenum or tungsten, a counter electrode of glassy carbon or tungsten, and a reference electrode of silver are used.

Molten $UCl_4$ salt 416 is placed in the bottom of the cell 402 and maintained in a molten state during the determination of the desired electric potential. In the embodiment shown, chlorine gas will be collected in the headspace above the molten salt. The headspace may be filled with an inert gas, such as argon or nitrogen. The pressure of the cell may be controlled through the addition or removal of the inert gas to obtain data at different operating conditions. Using the potentiostat of FIG. 3 and cell setup of FIGS. 4A and 4B, an optimum electric potential for a given reduction reaction based on the operating parameters (temperature and pressure), initial salt composition, and final salt composition may be determined.

In addition, the same experiments and for determining the electric potential using the potentiostat of FIG. 3 and cell setup of FIGS. 4A and 4B may be used to determine how much $UCl_3$ is generated at a given current amperage level at the operating parameters for any particular salt composition. The integral of the applied current with respect to time gives total charge transferred to the salt, which can then be related to moles of uranium atoms reduced through Faraday's constant (F=96485 C/mol e−) as long as the current efficiency is known or estimated. Thus, the total amount of $UCl_3$ created can be controlled by controlling the time that a current is applied. The conversion, as a function of current amperage and time, may be verified using the potentiostat of FIG. 3 and cell setup of FIGS. 4A and 4B and empirically determined.

Returning now to the method of FIG. 2, the electric potential, however it was determined, is generated between the anode(s) and cathode(s) and current is applied to the initial salt in the current application operation 210 at an amperage and for the time necessary to obtain the desired final $UCl_3$ salt product. As described above, since the electric potential is selected so that it does not cause reduction of any other chloride species, $MCl_n$, in the initial salt, for each charge delivered to the salt by the applied current, a $U^{4+}$ ion is converted to a $U^{3+}$ ion, thereby converting a $UCl_4$ molecule into a $UCl_3$ molecule and releasing a $Cl^-$ ion into the salt. Thus, by controlling the amperage and time over which the current is applied, the amount of $UCl_3$ generated can be controlled, which in turn controls the final product of the method 200.

The method 200 allows any amount of the $UCl_4$ in the initial salt to be converted into $UCl_3$, simply by selecting the appropriate current application time, amperage and electric potential. For example, the method 200 can be used to generate a quantity of pure $UCl_3$, simply by providing pure $UCl_4$ as the initial salt and converting all the $UCl_4$ to $UCl_3$ by applying current for the appropriate amount of time.

Using pure (99.9%+) $UCl_4$ as the initial salt any $UCl_3$—$UCl_4$ salt combination may also be obtained. For example, for a given amount of $UCl_4$, the current application operation 210 may be performed for the length of time necessary to obtain $10UCl_3$-$90UCl_4$, $25UCl_3$-$75UCl_4$, $50UCl_3$-$50UCl_4$, $75UCl_3$-$25UCl_4$, or any other combination. Given the initial salt quantity, composition, and the amperage of the applied current, the necessary length of time to obtain a particular conversion can be easily determined using stoichiometry.

Similarly, by using a $UCl_4$-$MCl_n$ initial salt, any desired ternary $UCl_3$—$UCl_4$-$MCl_n$ salt may be obtained. For example, the ternary embodiment $17UCl_3$-$40.5UCl_4$-$42.5NaCl$ described in the prior applications may be obtained by using $57.5UCl_4$-$42.5NaCl$ as the initial salt and applying current for the time necessary to convert 17 moles of the $UCl_4$ to $UCl_3$.

During the current application operation 210, the amperage may be constant throughout the application time. In an alternative embodiment, the amperage may be varied within a range. In either embodiment, the length of time current is applied will take into account the amount of charge delivered to the salt in order to obtain the desired final product.

The fuel salt produced by the method 200 is then available to be used in a nuclear reactor to generate power, illustrated by the generate power operation 212. This will involve removing the synthesized salt from the electrolysis chamber, moving it to a reactor core of the nuclear reactor, and operating the reactor to controllably generate heat from the fuel salt and use that heat to generate power. Depending on the embodiment, the method 200 may be performed at the site of the nuclear reactor so that fuel salt may be manufactured on demand.

Figure 5:
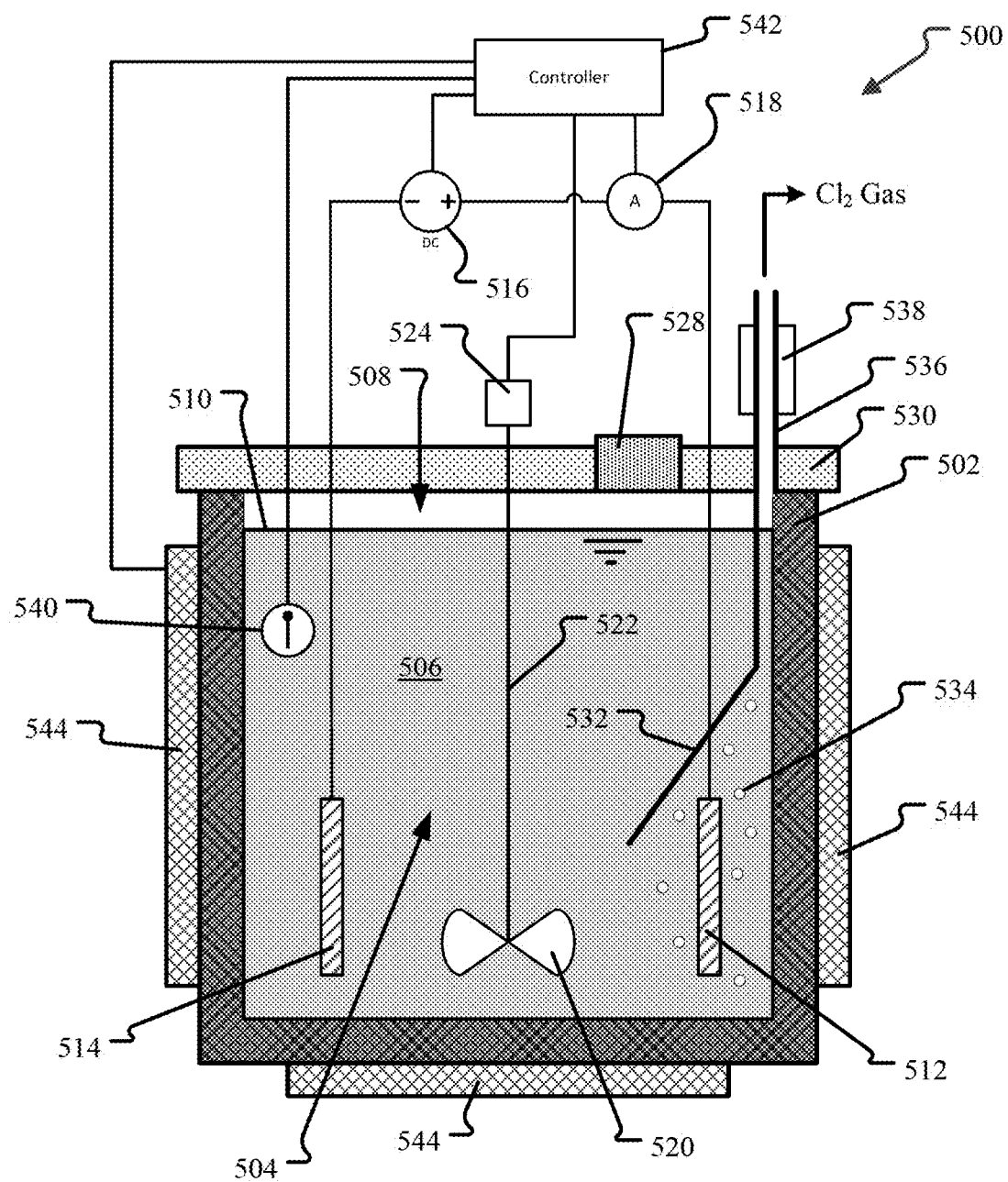
FIG. 5 illustrates an embodiment of a fuel salt electrolysis system that could be used for the synthesis method.

FIG. 5 illustrates an embodiment of a fuel salt electrolysis system that could be used for the synthesis method described above. In the system 500 shown, a vessel 502 having an interior wall defining an electrolysis chamber 504 is provided. The vessel 502 is capable of holding molten $UCl_3$ and $UCl_4$ under the conditions of operation, such as temperatures from 350-900° C. and pressures from 0.5-10 atm. In an embodiment, the vessel 502 may be unitary and made of a material suitable for the salt and conditions of operation, that is resistant to corrosion and/or radiation degradation due to the fuel salt. Thus, a vessel 502 made of a material unreactive with $UCl_4$ and $UCl_3$ at temperatures from 350-900° C. and pressures from 0.5-10 atm would be suitable.

In an alternative embodiment, a liner or protective layer may be provided on the salt-facing interior wall of the vessel 502. The protective layer is made of a material unreactive with $UCl_4$ and $UCl_3$ at temperatures from 350-900° C. and pressures from 0.5-10 atm. In this embodiment, the protective layer may or may not be a structural element and may only be provided to protect the material of vessel 502 from degradation by the salt.

In an embodiment, the vessel 502 or protective layer material that is salt-facing may be quartz, glassy carbon, an alloy of tungsten, or an alloy of molybdenum. Other corrosion resistant materials are also possible and include any material known in the art suitable for providing an internal surface of a reactor with corrosion and/or radiation resistance to a corresponding nuclear fuel salt. Thus, the material may vary depending on the salt composition used, particularly on the cation M of the non-fissionable salt $MCl_n$. In one embodiment, the vessel 502 and/or a protective layer may include one or more refractory metals. For example, the vessel 502 and/or a protective layer may include, but is not limited to, one or more of molybdenum, tantalum, niobium, tungsten or rhenium. In another embodiment, the protective layer 128 includes one or more refractory alloys. For example, the protective layer 128 may include, but is not limited to, one or more of a molybdenum alloy (e.g., titanium-zirconium-molybdenum (TZM) alloy), a tungsten alloy, tantalum, or a rhenium. In another embodiment, the vessel 502 and/or a protective layer includes one or more nickel alloys. In another embodiment, the vessel 502 and/or a protective layer includes a carbide, such as, but not limited to, silicon carbide.

The electrolysis chamber 504 is the interior of the vessel 502. It may be completely filled with salt 506 or partially filled (as shown) so that there is a headspace 508 of gas above the salt level 510.

In the embodiment shown, the vessel is provided a vessel head 530 as a cover that creates a closed chamber 504. In the embodiment shown, the vessel 502 has no penetrations, with every access point being through the head 530. This adds a measure of safety to the handling of the fuel salt. An additional safety measure, not shown, is to provide a secondary containment shell around the vessel 502. In the event of a leak, the secondary containment shell will prevent any fuel salt from being released.

One or more sealable access ports, such as the port 528 illustrated, are provided in the head 530 to allow salt to be placed into and removed from the electrolysis chamber 504. Other penetrations in the head 530 include penetrations for wiring, gas removal, pressurization, and the impeller rod 522, which will be discussed in greater detail below.

Conditions in the electrolysis chamber 504 may be monitored by one or more monitoring devices 540, such as the temperature monitor 540 shown. Monitoring devices may be located in any location or component, as necessary. For example, a pressure monitor may be located in the vessel head 530 or in the headspace 508. Temperature monitors 540 may be located in the chamber 504 below the salt level 510, in the vessel 502 or in the head 530. Temperature and pressure monitors 540 may also be located in the gas collection system and used to monitor the conditions of gas leaving the system 500.

In the embodiment shown, two electrodes 512, 514 are provided. One electrode 512 operates as an anode 512. The other operates as a cathode 514. In alternative embodiments, multiple cathodes 514 and/or anodes 512 may be provided. In addition, different anode 512 and cathode 514 configurations may be used. For example, in an embodiment the anode 512 may be a single electrode centrally-located within the electrolysis chamber 504 and the cathode 514 may take the form of a ring around the centrally-located cathode, or even a sphere. The ring-shaped cathode 514 may be a single cathode, or may be multiple spaced-apart electrodes that generally form a ring with the anode 512 at the center.

The electrodes 512, 514 may be of the same or different material. In an embodiment, the material is unreactive with $UCl_4$ and $UCl_3$ at the operating conditions, such as temperatures from 350-900° C. and pressures from 0.5-10 atm. Examples of suitable materials include silver, glassy carbon, an alloy of tungsten, or an alloy of molybdenum. Other materials are also possible.

A direct current power source 516 is connected to the cathode 514 and anode 512. The power source 516 is capable of creating a potential and applying electric current between the cathode 514 and anode 512. In the embodiment shown, an ammeter 518 is also provided to monitor the applied current.

An impeller 520 connected by a rod 522 to a motor 524 is provided in order to agitate the salt 506. Again, the salt-facing surfaces and components may be made of a corrosion and radiation damage resistant material as described above. The motor 524 is located out of the electrolysis chamber to protect it from the fuel salt. In an alternative embodiment, discussed above, a different system for agitating the fuel salt while in the chamber 504 may be used.

A gas collector 532 is provided to collect $Cl_2$ gas produced during the synthesis of $UCl_3$. In the embodiment shown, the collector 532 is essentially a hood-like element in the electrolysis chamber 504 that directs gas bubbles 534 into a chute 536 that exits the head 530. The gas collector 532 is located above the anode 512, which is where the reduction reaction occurs and $Cl_2$ will be generated. In an alternative embodiment no gas collector 532 is used. Rather, the $Cl_2$ is allowed to collect in the headspace 508 and, using a pressure relief valve, when the pressure increases to some threshold, the $Cl_2$ gas is removed through the head 530. In an embodiment, the $Cl_2$ gas may be collected and reused or sold, particularly if enriched $^{37}Cl_2$ is being used.

In the embodiment shown, a condenser 538 is provided to condense any $UCl_4$ which may be volatilized from the fuel salt. The condenser 538 illustrated is a cooling jacket surround a length of the chute 536 that cools the exiting gas to a temperature below the melting point of $UCl_4$. Any $UCl_4$ gas condenses onto the sides of the chute and flows back into the electrolysis chamber 504. Many other condenser designs may be utilized, including designs that do not return the $UCl_4$ to the electrolysis chamber 504. If a non-returning design is used, the anticipated amount of $UCl_4$ lost with the exhaust gas may need to be accounted for when determining the initial and final salt compositions.

A system controller 542 is also provided. The controller 542 is connected to the power source 516 to control the potential and electric current generated and applied to the electrodes. As discussed above, the system controller 542 is configured to maintain the potential between the cathode 514 and anode 512 within a range that reduces $U^{4+}$ to $U^{3+}$ without reducing $U^{3+}$ and, if a non-fissile salt $MCl_n$ is present, without reducing cations, $M^{n+}$, of any non-fissile salt. The system controller 542 may be a general purpose computer programmed to operate the system 500 or may be a purpose-built controller. In the embodiment shown, the controller 542 is attached to the monitoring devices 540, the motor 424, and the ammeter 518 through which it can control the operation of the system 500.

The system 500 further includes a number of heating elements, illustrated as heaters 544 on the exterior walls and bottom of the vessel 502. In an embodiment, the heaters are jacket heaters that run heated fluid through the heaters. Other heating systems may be used including placing heating elements within the electrolysis chamber 504 in contact with the salt. The heating elements 544 are connected to the system controller 542 so that the controller can maintain the temperature of the salt in the electrolysis chamber at the desired temperature or within the desired temperature range.

Note that the synthesis method and systems described herein may be easily adapted to generate enriched-uranium or enriched-chloride fuel salts. Uranium enrichment can be easily achieved by starting with $^{235}$U enriched $UCl_4$. Chlorine enrichment can be obtained by providing $^{37}$Cl enriched $UCl_4$, $MCl_n$, or both at the stoichiometric amount desired.

Notwithstanding the appended claims, the technology described in this disclosure is also defined by the following numbered clauses:

1. A method for synthesizing $UCl_3$ comprising:
providing a quantity of fuel salt, the fuel salt having a first amount of $UCl_4$;
melting the quantity of fuel salt; and
applying an electric current to the fuel salt, thereby reducing at least some $UCl_4$ to $UCl_3$.

2. The method of clause 1 further comprising:
applying the electric current to the fuel salt for a first length of time sufficient to reduce all of the $UCl_4$ to $UCl_3$.

3. The method of clause 1 further comprising:
applying the electric current to the fuel salt at an amperage and for a second length of time different from the first length of time, wherein the amperage of the applied electric current over the second length of time is stoichiometrically calculated to create a target amount of $UCl_3$.

4. The method of clause 3 wherein applying the electric current to the fuel salt comprises:
applying the electric current to the fuel salt at a constant amperage for the second length of time.

5. The method of clause 3 further comprising:
identifying a desired final ratio of $UCl_3$ to $UCl_4$ to be obtained in the quantity of fuel salt;
determining the target amount of $UCl_3$ to be created based on the desired final ratio and the quantity of fuel salt;
stoichiometrically determining the amperage and second length of time for the applied electric current based on the target amount of $UCl_3$ to be created; and
applying the electric current at the stoichiometrically determined amperage for the second length of time, thereby creating a fuel salt having the desired final ratio of $UCl_3$ to $UCl_4$.

6. The method of clause 3 wherein the stoichiometric amount of electric current is calculated to reduce all of the $UCl_4$ to $UCl_3$.

7. The method of any of clauses 1-6 wherein the fuel salt is at least 99.9% $UCl_4$.

8. The method of any of clauses 1-7 wherein the fuel salt is a mixture of $UCl_4$ and at least one non-fissile chloride compound.

9. The method of clause 8 wherein the at least one non-fissile chloride compound is one or more of NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$ and/or $NdCl_3$.

10. The method of clause 8 wherein the at least one non-fissile chloride compound includes NaCl.

11. The method of clause 10 wherein the at least one non-fissile chloride compound is only NaCl.

12. The method of any of clauses 1-11 wherein applying the electric current further comprises:
submerging at least one anode and at least one cathode in the molten fuel salt; and
passing the electric current between the at least one anode and at least one cathode submerged in the molten fuel salt.

13. The method of clause 12 further comprising:
generating an electric potential between the at least one anode and the at least one cathode.

14. The method of clause 13 wherein the fuel salt is a mixture of $UCl_4$ and at least one non-fissile chloride compound and generating further comprises:
selecting the electric potential based on a temperature and pressure of the fuel salt to preferentially reduce the $UCl_4$ to $UCl_3$ without reducing the at least one non-fissile chloride compound.

15. The method of any of clauses 1-14 further comprising:
maintaining the fuel salt in a molten state while applying the electric current to the fuel salt.

16. The method of clause 15 wherein the maintaining the fuel salt in a molten state comprises:
changing one or both of a temperature or pressure of the fuel salt while applying the electric current to the fuel salt.

17. The method of clause 15 wherein the maintaining the fuel salt in a molten state comprises:
monitoring the electric current applied to the fuel salt; and
changing one or both of the temperature or pressure of the fuel salt based on the monitored electric current.

18. The method of any of clauses 1-17 further comprising:
collecting $Cl_2$ generated by reducing the $UCl_4$ in the fuel salt to $UCl_3$.

19. The method of clause 18 wherein collecting $Cl_2$ comprises:
containing the fuel salt in a closed vessel while applying the electric current to the fuel salt;
removing gas evolved during the applying operation from the closed vessel;
separating $Cl_2$ in the removed gas from $UCl_4$ in the removed gas; and
returning the $UCl_4$ to the closed vessel.

20. The method of clause 19 wherein separating the $Cl_2$ and $UCl_4$ comprises:
condensing the $UCl_4$ in the removed gas into liquid $UCl_4$; and
returning the liquid $UCl_4$ to the closed vessel.

21. The method of any of clauses 1-20 further comprising:
agitating the fuel salt while applying the electric current to the fuel salt.

22. A method for synthesizing a $UCl_3$—$UCl_4$—NaCl fuel salt comprising:
providing an amount of $UCl_4$—NaCl salt;
melting the $UCl_4$—NaCl salt; and
reducing a portion of the $UCl_4$ in the $UCl_4$—NaCl salt to $UCl_3$ by applying an electric current to the $UCl_4$—NaCl salt, thereby creating the $UCl_3$—$UCl_4$—NaCl fuel salt.

23. The method of clause 22 further comprising:
placing the $UCl_3$—$UCl_4$—NaCl fuel salt in a reactor core;
removing heat from the $UCl_3$—$UCl_4$—NaCl fuel salt; and
using the removed heat to generate power.

24. The method of clause 22 or 23 further comprising:
applying the electric current to the salt at an amperage and for a length of time, the amperage of the applied electric current over the length of time stoichiometrically calculated to create a target amount of $UCl_3$.

25. The method of clause 24 wherein applying the electric current to the fuel salt comprises:

applying the electric current to the fuel salt at a constant amperage for the length of time.

26. The method of clause 24 further comprising:
identifying a desired final ratio of $UCl_3$ to $UCl_4$ to be obtained in the quantity of fuel salt;
determining the target amount of $UCl_3$ to be created based on the desired final ratio and the quantity of fuel salt;
stoichiometrically determining the amperage and length of time for the applied electric current based on the target amount of $UCl_3$ to be created; and
applying the electric current at the stoichiometrically determined amperage for the length of time, thereby creating a fuel salt having the desired final ratio of $UCl_3$ to $UCl_4$.

27. The method of any of clauses 22-26 wherein applying the electric current further comprises:
submerging at least one anode and at least one cathode in the molten $UCl_4$—NaCl salt; and
passing the electric current between the at least one anode and at least one cathode submerged in the molten fuel salt.

28. The method of clause 27 further comprising:
generating an electric potential between the at least one anode and the at least one cathode.

29. The method of clause 28 further comprising:
selecting the electric potential based on a temperature and pressure of the fuel salt to preferentially reduce the $UCl_4$ to $UCl_3$ without reducing the NaCl.

30. The method of any of clauses 22-29 further comprising:
maintaining the salt in a molten state while applying the electric current to the fuel salt.

31. The method of clause 30 wherein the maintaining the salt in a molten state comprises:
changing one or both of a temperature or pressure of the fuel salt while applying the electric current to the molten fuel salt.

32. The method of clause 31 wherein the maintaining the fuel salt in a molten state comprises:
monitoring the electric current applied to the fuel salt; and
changing one or both of the temperature or pressure of the fuel salt based on the monitored electric current.

33. The method of any of clauses 22-32 further comprising:
collecting $Cl_2$ generated by reducing the $UCl_4$ in the fuel salt to $UCl_3$.

34. The method of clause 33 wherein collecting $Cl_2$ comprises:
containing the fuel salt in a closed vessel while applying the electric current to the fuel salt;
removing gas evolved during the applying operation from the closed vessel;
separating $Cl_2$ in the removed gas from $UCl_4$ in the removed gas; and
returning the $UCl_4$ to the closed vessel.

35. The method of clause 34 wherein separating the $Cl_2$ and $UCl_4$ comprises:
condensing the $UCl_4$ in the removed gas into liquid $UCl_4$; and
returning the liquid $UCl_4$ to the closed vessel.

36. The method of any of clauses 22-35 further comprising:
agitating the fuel salt while applying the electric current to the fuel salt.

37. A system for the synthesis of $UCl_3$ from $UCl_4$ comprising:
a vessel having an interior wall defining an electrolysis chamber capable of holding molten $UCl_3$ and $UCl_4$, the interior wall material unreactive with $UCl_4$ and $UCl_3$ at temperatures from 350-900° C. and pressures between 0.5 and 10 atm;
at least one cathode and at least one anode in the electrolysis chamber, the at least one cathode and at least one anode made of material unreactive with $UCl_4$ and $UCl_3$ at temperatures from 350-900° C. and pressures between 0.5 and 10 atm;
a power source connected to the at least one cathode and at least one anode, the power source capable of creating a potential and flowing an electric current between the at least one cathode and at least one anode; and
a system controller connected to the power source to control the potential and electric current from the power source between the at least one cathode and at least one anode, the system controller configured to maintain the potential between the at least one cathode and at least one anode within a range that reduces $U^{4+}$ to $U^{3+}$ without reducing $U^{3+}$.

38. The system of clause 37 wherein the material unreactive with $UCl_4$ and $UCl_3$ at temperatures from 350-900° C. and pressures between 0.5 and 10 atm is selected from quartz, glassy carbon, an alloy of tungsten, or an alloy of molybdenum.

39. The system of clause 37 or 38 wherein the at least one cathode or the at least one anode is a rod made of glassy carbon, an alloy of tungsten, or an alloy of molybdenum.

40. The system of any of clauses 37-39 further comprising:
a gas collector that removes $Cl_2$ gas produced during the synthesis of $UCl_3$ from the vessel.

41. The system of clause 40 wherein the gas collector is located above the at least one anode.

42. The system of any of clauses 37-41 further comprising:
a sealable supply opening in the vessel through which $UCl_4$ may be placed in the electrolysis chamber and $UCl_4$ and $UCl_3$ removed from the electrolysis chamber.

43. The system of any of clauses 37-42 further comprising:
a heating element coupled to the vessel; and
the system controller connected to the heating element capable of controlling the temperature of molten $UCl_3$ and $UCl_4$ in the vessel.

44. The system of any of clauses 37-43 wherein the system is configured to synthesize $UCl_3$ from a fuel salt that includes $UCl_4$ and at least one non-fissile chloride compound; and
wherein the system controller is further configured to maintain the potential between the at least one cathode and at least one anode within a range that reduces $U^{4+}$ to $U^{3+}$ without reducing either $U^{3+}$ or a cation of the at least one non-fissile chloride compound.

45. The system of clause 44 wherein the fuel salt is a $UCl_4$—NaCl fuel salt and the system controller is further configured to maintain the potential between the at least one cathode and at least one anode within a range that reduces $U^{4+}$ to $U^{3+}$ without reducing either $U^{3+}$ or $Na^{1+}$.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements, such as the controller 542, being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope of the technology described herein. For example, gas sparging with an inert gas may be used to provide agitation within the electrolysis chamber. Further, in such a system, any $UCl_4$ gas collected with the $Cl_2$ exiting the vessel may be routed back into the salt via the inert gas being delivered to the sparging system. Numerous other changes may be made which will readily suggest themselves to those skilled in the art and which are encompassed in the spirit of the disclosure and as defined in the appended claims.

What is claimed is:

1. A method for synthesizing $UCl_3$ comprising:
providing a quantity of fuel salt in a molten state, the fuel salt having a first amount of $UCl_4$ and at least one non-fissile chloride compound selected from NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$ and/or $NdCl_3$; and
applying an electric current to the fuel salt, thereby reducing at least some $UCl_4$ to $UCl_3$.

2. The method of claim 1 further comprising:
applying the electric current to the fuel salt for a length of time sufficient to reduce all of the $UCl_4$ to $UCl_3$.

3. The method of claim 1 further comprising:
applying the electric current to the fuel salt at an amperage and for a length of time stoichiometrically calculated to create a target amount of $UCl_3$.

4. The method of claim 3 wherein applying the electric current to the fuel salt comprises:
applying the electric current to the fuel salt at a constant amperage.

5. The method of claim 3 further comprising:
identifying a desired final ratio of $UCl_3$ to $UCl_4$ to be obtained in the quantity of fuel salt;
determining the target amount of $UCl_3$ to be created based on the desired final ratio and the quantity of fuel salt;
stoichiometrically determining the amperage and length of time for the applied electric current based on the target amount of $UCl_3$ to be created; and
applying the electric current at the stoichiometrically determined amperage for the length of time, thereby creating a fuel salt having the desired final ratio of $UCl_3$ to $UCl_4$.

6. The method of claim 3 wherein the stoichiometric amount of electric current is calculated to reduce all of the $UCl_4$ to $UCl_3$.

7. The method of claim 1 wherein the fuel salt is at least 99.9% $UCl_4$.

8. The method of claim 1, wherein the at least one non-fissile chloride compound is only NaCl.

9. The method of claim 1 wherein applying the electric current further comprises:
passing the electric current between at least one anode and at least one cathode submerged in the molten fuel salt.

10. The method of claim 1, further comprising:
selecting an electric potential based on a temperature and pressure of the fuel salt to preferentially reduce the $UCl_4$ to $UCl_3$ without reducing the at least one non-fissile chloride compound; and
generating the selected electric potential between at least one anode and at least one cathode.

11. The method of claim 1 further comprising:
maintaining the fuel salt in a molten state while applying the electric current to the fuel salt.

12. The method of claim 11 wherein the maintaining the fuel salt in a molten state comprises:
monitoring the electric current applied to the fuel salt; and
changing one or both of the temperature or pressure of the fuel salt based on the monitored electric current.

13. The method of claim 1 further comprising:
collecting $Cl_2$ generated by reducing the $UCl_4$ in the fuel salt to $UCl_3$.

14. The method of claim 13 wherein collecting $Cl_2$ comprises:
containing the fuel salt in a closed vessel while applying the electric current to the fuel salt;
removing gas evolved during the applying operation from the closed vessel;
separating $Cl_2$ in the removed gas from $UCl_4$ in the removed gas; and
returning the $UCl_4$ to the closed vessel.

15. The method of claim 14 wherein separating the $Cl_2$ and $UCl_4$ comprises:
condensing the $UCl_4$ in the removed gas into liquid $UCl_4$; and
returning the liquid $UCl_4$ to the closed vessel.

16. The method of claim 1 further comprising:
agitating the fuel salt while applying the electric current to the fuel salt.

17. A method comprising:
providing a quantity of molten fuel salt, the molten fuel salt having a first amount of $UCl_4$;
applying an electric current to the molten fuel salt, thereby reducing at least some $UCl_4$ to $UCl_3$; and
collecting $Cl_2$ generated by reducing the $UCl_4$ to $UCl_3$.

18. The method of claim 17 wherein collecting $Cl_2$ comprises:
containing the molten fuel salt in a closed vessel while applying the electric current to the molten fuel salt;
removing gas evolved during the applying operation from the closed vessel;
separating $Cl_2$ in the removed gas from $UCl_4$ in the removed gas; and
returning the $UCl_4$ to the closed vessel.

19. The method of claim 18 wherein separating the $Cl_2$ and $UCl_4$ comprises:
condensing the $UCl_4$ in the removed gas into liquid $UCl_4$; and
returning the liquid $UCl_4$ to the closed vessel.

20. The method of claim 17 wherein the molten fuel salt is a mixture of $UCl_3$, $UCl_4$ and at least one non-fissile chloride compound.

21. The method of claim 20 wherein the at least one non-fissile chloride compound is one or more of NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$ and/or $NdCl_3$.

22. The method of claim 21 wherein the at least one non-fissile chloride compound is only NaCl.

23. The method of claim 17 further comprising:
maintaining the molten fuel salt in a molten state while applying the electric current to the fuel salt.

24. The method of claim 17 further comprising:
monitoring the electric current applied to the molten fuel salt.

25. The method of claim 17 further comprising:
applying the electric current to the molten fuel salt for a length of time sufficient to reduce all of the $UCl_4$ to $UCl_3$.

26. A method comprising:
providing a quantity of molten fuel salt, the fuel salt having a first amount of $UCl_4$; and
applying an electric current to the molten fuel salt, thereby reducing at least some $UCl_4$ to $UCl_3$; and
agitating the molten fuel salt while applying the electric current to the molten fuel salt.

27. The method of claim 26 wherein the molten fuel salt is a mixture of $UCl_3$, $UCl_4$ and at least one non-fissile chloride compound.

28. The method of claim 27 wherein the at least one non-fissile chloride compound is one or more of NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$ and/or $NdCl_3$.

29. The method of claim 28 wherein the at least one non-fissile chloride compound is only NaCl.

30. The method of claim 26 further comprising:
applying the electric current to the fuel salt for a length of time sufficient to reduce all of the $UCl_4$ to $UCl_3$.

31. The method of claim 26 further comprising:
applying the electric current to the fuel salt at an amperage and for a length of time stoichiometrically calculated to create a target amount of $UCl_3$.

32. The method of claim 31 wherein applying the electric current to the fuel salt comprises:
applying the electric current to the fuel salt at a constant amperage.

33. The method of claim 32 further comprising:
identifying a desired final ratio of $UCl_3$ to $UCl_4$ to be obtained in the quantity of fuel salt;
determining the target amount of $UCl_3$ to be created based on the desired final ratio and the quantity of fuel salt;
stoichiometrically determining the amperage and length of time for the applied electric current based on the target amount of $UCl_3$ to be created; and
applying the electric current at the stoichiometrically determined amperage for the length of time, thereby creating a fuel salt having the desired final ratio of $UCl_3$ to $UCl_4$.

34. The method of claim 33 wherein the stoichiometric amount of electric current is calculated to reduce all of the $UCl_4$ to $UCl_3$.

35. The method of claim 26 wherein the fuel salt is at least 99.9% $UCl_4$.

36. The method of claim 26 further comprising:
maintaining the fuel salt in a molten state while applying the electric current to the fuel salt.

37. The method of claim 36 wherein the maintaining the fuel salt in a molten state comprises:
monitoring the electric current applied to the fuel salt; and
changing one or both of the temperature or pressure of the fuel salt based on the monitored electric current.

38. The method of claim 26 further comprising:
collecting $Cl_2$ generated by reducing the $UCl_4$ in the fuel salt to $UCl_3$.

39. The method of claim 38 wherein collecting $Cl_2$ comprises:
containing the fuel salt in a closed vessel while applying the electric current to the fuel salt;
removing gas evolved during the applying operation from the closed vessel;
separating $Cl_2$ in the removed gas from $UCl_4$ in the removed gas; and
returning the $UCl_4$ to the closed vessel.

40. The method of claim 39 wherein separating the $Cl_2$ and $UCl_4$ comprises:
condensing the $UCl_4$ in the removed gas into liquid $UCl_4$; and
returning the liquid $UCl_4$ to the closed vessel.

41. A method for synthesizing $UCl_3$ comprising:
providing a quantity of molten fuel salt, the fuel salt having a first amount of $UCl_4$; and
applying an electric current to the fuel salt for a first length of time sufficient to reduce all of the $UCl_4$ to $UCl_3$.

42. The method of claim 41 further comprising:
agitating the molten fuel salt while applying the electric current to the molten fuel salt.

43. The method of claim 41 wherein the molten fuel salt is a mixture of $UCl_3$, $UCl_4$ and at least one non-fissile chloride compound.

44. The method of claim 43 wherein the at least one non-fissile chloride compound is one or more of NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$ and/or $NdCl_3$.

45. The method of claim 44 wherein the at least one non-fissile chloride compound is only NaCl.

46. The method of claim 41 further comprising:
collecting $Cl_2$ generated by reducing the $UCl_4$ in the fuel salt to $UCl_3$.

47. The method of claim 46 wherein collecting $Cl_2$ comprises:
containing the fuel salt in a closed vessel while applying the electric current to the fuel salt;
removing gas evolved during the applying operation from the closed vessel;
separating $Cl_2$ in the removed gas from $UCl_4$ in the removed gas; and
returning the $UCl_4$ to the closed vessel.

48. The method of claim 47 wherein separating the $Cl_2$ and $UCl_4$ comprises:
condensing the $UCl_4$ in the removed gas into liquid $UCl_4$; and
returning the liquid $UCl_4$ to the closed vessel.

* * * * *